United States Patent
Bjorner et al.

(10) Patent No.: US 9,489,221 B2
(45) Date of Patent: Nov. 8, 2016

(54) MATCHING BASED PATTERN INFERENCE FOR SMT SOLVERS

(75) Inventors: Nikolaj S. Bjorner, Woodinville, WA (US); Leonardo Mendonca de Moura, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1632 days.

(21) Appl. No.: 12/146,373

(22) Filed: Jun. 25, 2008

(65) Prior Publication Data

US 2009/0328015 A1   Dec. 31, 2009

(51) Int. Cl.
*G06F 9/44* (2006.01)
*G06F 9/445* (2006.01)

(52) U.S. Cl.
CPC ................................. *G06F 9/44589* (2013.01)

(58) Field of Classification Search
None
See application file for complete search history.

(56) References Cited

U.S. PATENT DOCUMENTS

| | | | | |
|---|---|---|---|---|
| 5,983,022 | A * | 11/1999 | Watkins et al. | 717/144 |
| 6,292,762 | B1 * | 9/2001 | Moll et al. | 703/1 |
| 6,292,810 | B1 * | 9/2001 | Richards | 715/201 |
| 6,343,372 | B1 * | 1/2002 | Felty et al. | 717/136 |
| 6,343,376 | B1 * | 1/2002 | Saxe et al. | 717/154 |
| 6,424,962 | B1 * | 7/2002 | Billon | 706/61 |
| 7,036,115 | B2 * | 4/2006 | Nelson | 717/151 |
| 7,054,315 | B2 | 5/2006 | Liao | |
| 7,227,946 | B2 * | 6/2007 | Launchbury et al. | 380/28 |
| 2005/0010581 | A1 * | 1/2005 | Doan | 707/100 |
| 2005/0188123 | A1 * | 8/2005 | Chen | 710/33 |
| 2006/0236274 | A1 | 10/2006 | Baumgartner et al. | |
| 2007/0074152 | A1 | 3/2007 | Roe | |
| 2008/0066160 | A1 * | 3/2008 | Becker et al. | 726/4 |

FOREIGN PATENT DOCUMENTS

WO   WO0055753   9/2000

OTHER PUBLICATIONS

Dutertre, et al., "The YICES SMT Solver", available at least as early as Sep. 6, 2007, at <<http://yices.csl.sri.com/tool-paper.pdf>>, pp. 5.

Flanagan, et al., "An Explicating Theorem Prover for Quantified Formulas", at <<http://hpl.hp.com/techreports/2004/HPL-2004-199.pdf>>, Hewlett-Packard Company, 2004, pp. 16.

Leino, et al., "A Two-Tier Technique for Supporting Quantifiers in a Lazily Proof-Explicating Theorem Prover", available at least as early as Sep. 6, 2007, at <<https://research.microsoft.com/~madanm/papers/krml151.pdf>>, pp. 13.

Moskal, et al., "E-matching for Fun and Profit", available at least as early as Sep. 6, 2007, at <<http://nemerle.org/~malekith/smt/e-matching.pdf>>, pp. 15.

Ranise, et al., "The SMT-LIB Standard: Version 1.2", at <<http://combination.cs.uiowa.edu/smtlib/papers/format-v1.2-r06.08.30.pdf>>, Aug 30, 2006, pp. 43.

\* cited by examiner

*Primary Examiner* — Lewis A Bullock, Jr.
*Assistant Examiner* — Christine Dang
(74) *Attorney, Agent, or Firm* — Alin Corie; Sandy Swain; Micky Minhas

(57) ABSTRACT

A method for automatically analyzing formulas and adding pattern annotations to quantifiers based on a database of common pattern idioms. The method involves matching base pattern inference for Satisfiability Modulo Theories (SMT) solvers. The method uses a database for fault detection in externally supplied pattern annotated formulas. The method also uses matching code trees to mixed second-order pattern matching.

20 Claims, 3 Drawing Sheets

|  | Init(∨, pc1) | Match the top-symbol ∨, store the matched term in reg[0] |
|---|---|---|
| Pc1 | Bind-ac(0, ∨, 2, 1, pc2) | Match the symbol ∨ with the term stored in reg[0]. There are two arguments to ∨ in the pattern, so the two arguments will be placed in registers 1 and 2 (since bind-ac is called constructed with $n = 2$, and register offset $o = 1$). |
| Pc2 | Bind(1, ¬, 3, pc3) | Match the symbol ¬ with the term stored in register 1 (reg[1]), store the argument in reg[3]. |
| Pc3 | Bind-ac(3, =, 2, 4, pc4) | Match the symbol '=' with the term stored in reg[3]. There are two arguments to '=', so reserve registers reg[4] and reg[5] for these two arguments |
| Pc4 | Setvar(?f, 4, 1, 6, pc5) | Match the term in reg[4] with a unary function application. The argument to the unary function is stored in reg[6]. |
| Pc5 | Setbound(6, 0, 0, pc6) | Match the term in reg[6] with a bound variable. This is the first bound variable to be processed so the number of previously bound variables $n$ is 0. It is also the first bound variable in the pattern, so its index $b$ is 0. |
| Pc6 | Checkvar(5, 4, 7, pc7) | Check that the functions stored in reg[5] and reg[4] have the same function symbol (and same number of arguments). Store the argument to the function term stored in reg[5] (there is only one) in reg[7]. |
| Pc7 | Setbound(7, 1, 1, pc8) | Match the term in reg[7] with a bound variable. This is the second bound variable to be processed so the number of previously bound variables $n$ is 1. It is also the second bound variable in the pattern, so its index $b$ is 1. |
| Pc8 | Bind-ac(2, =, 2, 8, pc9) | Match the term in reg[2] with the head function symbol '='. There are two arguments to '=', so reserve registers reg[8] and reg[9] for these two arguments. |
| Pc9 | Checkbound(8, 0, pc10) | Check that reg[8] contains a bound variable and it is the same bound variable that is stored in bound[0]. |
| Pc10 | Checkbound(9, 1, pc11) | Check that reg[9] contains a bound variable and that it is the same bound variable that is stored in bound[1] |
| Pc11 | Yield(4) | Return the top-most function symbol stored in reg[4]. |

Fig. 1

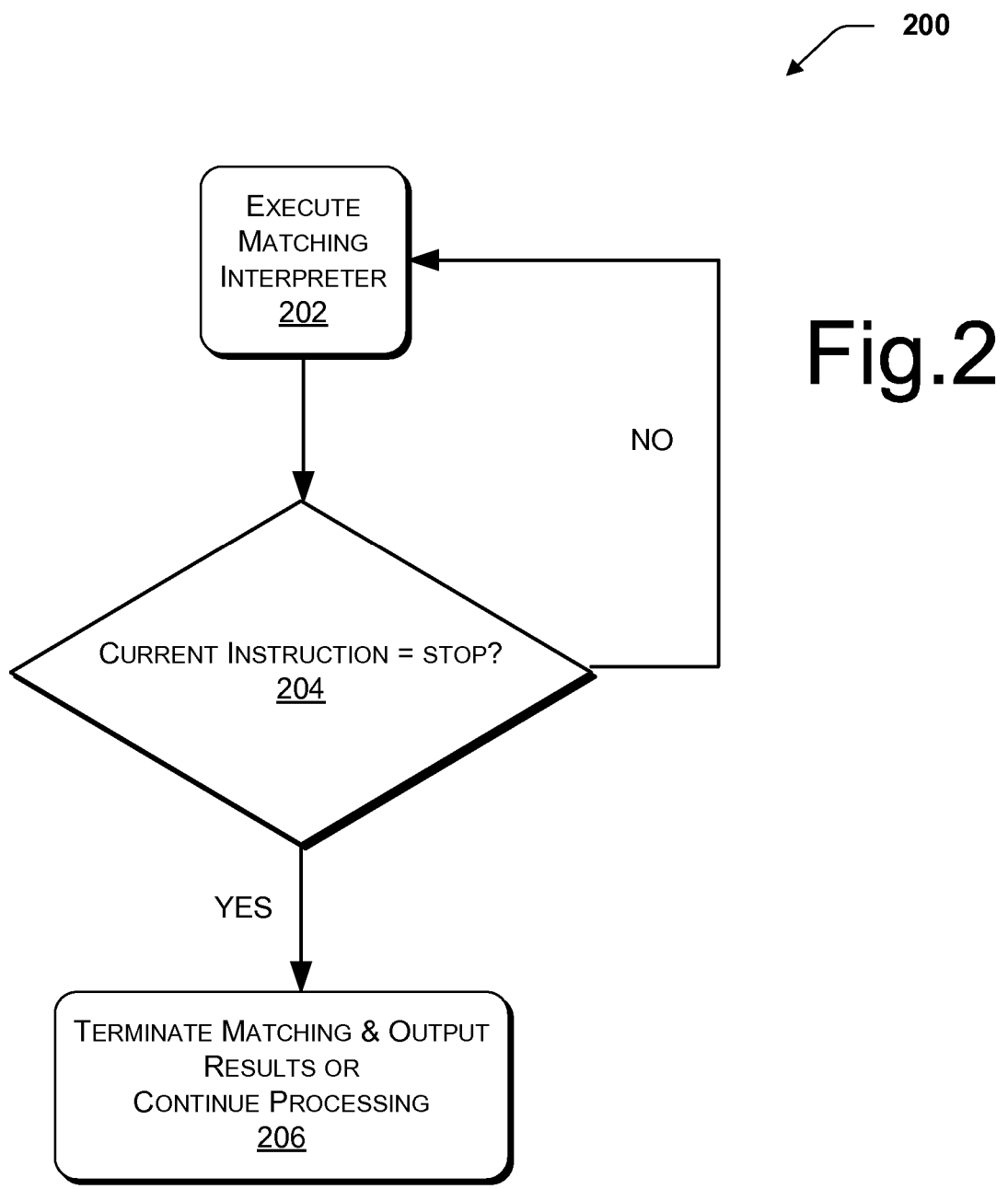

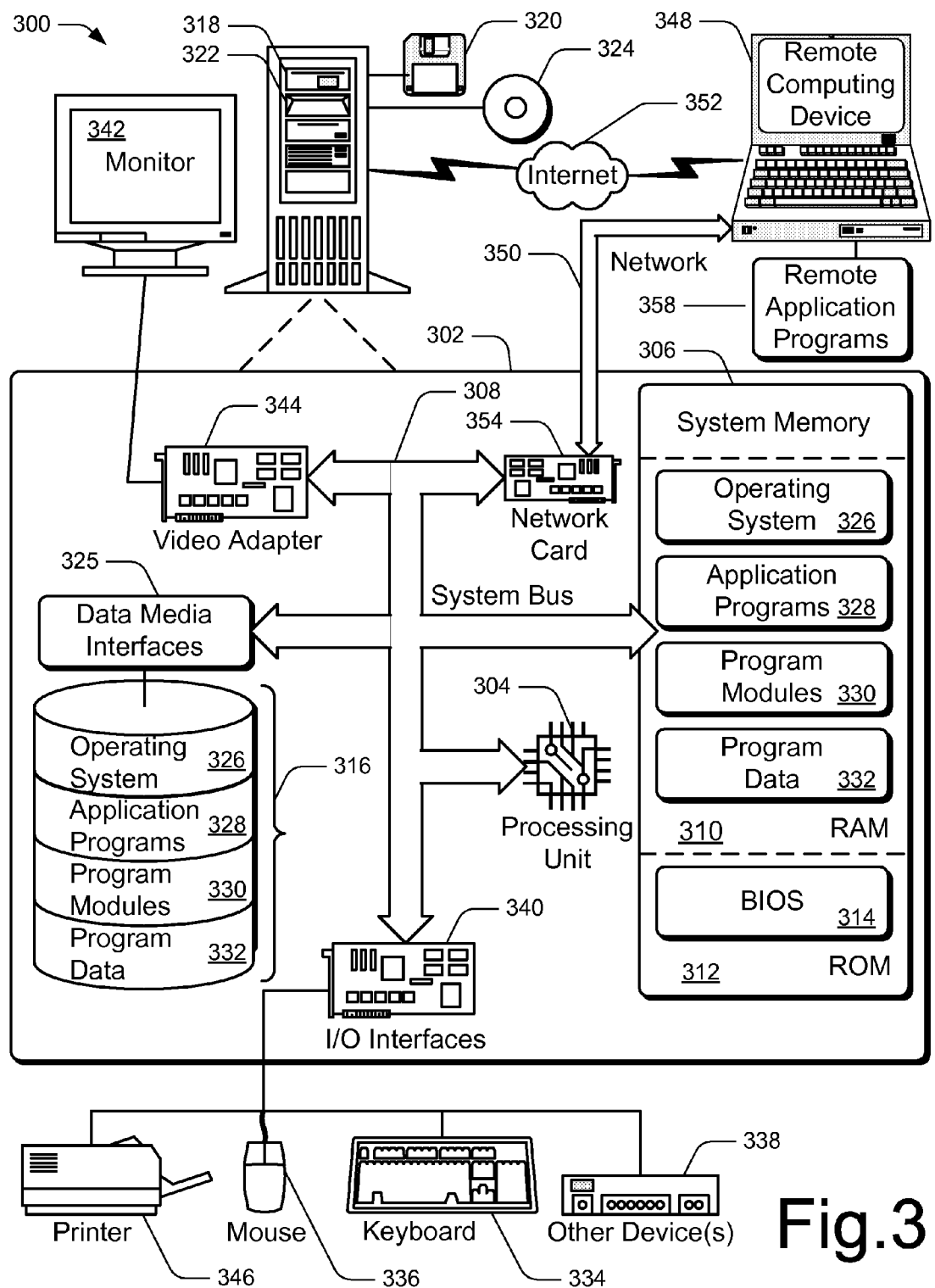

MATCHING BASED PATTERN INFERENCE FOR SMT SOLVERS

BACKGROUND

For purposes of analysis, it is often efficient and desirable to automate the reasoning about the complexity of software using tools and abstractions which can describe the properties and behavior of computer software. Computer software may often be formally described for the purposes of such analysis by specifying a set of constraints or axioms formalizing the relationships and operation of the software.

Automated theorem proving (ATP), or automated deduction, is currently a well-developed subfield of automated reasoning (AR). ATP is the proving of mathematical theorems by a computer program. Theorem provers are useful in a wide range of applications such as in computer software and hardware analysis, software systems requirements analysis, and compiler verification. One type of theorem prover is known as a satisfiability modulo theory or theorem (SMT) solver.

In many theorem solvers, including SMT solvers, it is important to consider the amount of time it takes a solver to solve theorems and the amount of computing resources (such as memory space or processor power) which may be required by the solver. Further, efficiency is an important goal in implementing these solvers, measured by, for example, the amount of time it takes a solver to prove a theorem.

SMT solvers have proven highly successful for program verification applications. Their ability to combine efficient quantifier reasoning with theory solvers for specialized domains, such as linear arithmetic or bit-vectors, makes SMT solvers particularly attractive.

Unfortunately, for quantifier instantiation, the wrong guidance may result in massively wasted search. To reduce the search space, a careful annotation of quantifiers using patterns can be used to guide quantifier instantiation to only involve terms matching the pattern annotations. Pattern annotations are either added by compilers that generate formulas, or by users, who annotate the patterns according to their best abilities, but sometimes with unintended results. Common mistakes are often repeated by several users when each user has to re-learn the same lessons from good and bad practices.

SUMMARY

Described herein is an exemplary system and method for automatically analyzing formulas and adding pattern annotations to quantifiers based on a database of common pattern idioms. The method preferably involves matching base pattern inference for satisfiability modulo theory (SMT) solvers. The method uses a database of known patterns or formulas for fault detection in externally supplied pattern annotated formulas. The method also uses matching code trees to mixed second-order pattern matching.

Mixed second-order matching is used to identify quantified formulas with pre-stored patterns in a database of formulas and patterns. Matching code trees are used to share computations when identifying a quantified formula with a large number of previously stored patterns. Matching code trees enable matching formulas modulo (taking into account) renaming of relations, function symbols and bound variables. Matching code trees apply to formulas with associative and commutative operators, such as conjunction and disjunction. Thus, matching may proceed with tolerance to renaming and permutations of arguments.

Mixed second-order matching combines weak and strong second-order variables. Strong second-order variables are relations that are allowed to be instantiated by compound terms. Weak second-order variables range over relations to be instantiated only by function symbols. The restriction on weak second-order variables allow for matching quantified formulas that contain several bound identifiers (these are also called variables, but should not be confused with the second-order variables) without depending on a particular order of the bound identifiers.

Thus, a system and apparatus is described where: a quantifier can be matched with a pattern that permutes the set of bound identifiers; a quantifier can be matched with a pattern that permutes a set of associative/commutative functions; a quantifier with compound sub-terms can be matched with a pattern that abstracts from compound sub-terms; and, a quantifier with arbitrary choice of names for functions and relations can be matched with a pattern that abstracts the names of functions and relations.

A system supporting all of these capabilities is presented uniformly using an abstract machine for matching code trees. The abstract machine contains instructions for each of the cases that apply above. The abstract machine is executed given the body of a quantified formula and a database of patterns.

This Summary is provided to introduce a selection of concepts in a simplified form that are further described below in the Detailed Description. This Summary is not intended to identify essential features of the claimed subject matter, nor is it intended to be used to limit the scope of the claimed subject matter.

BRIEF DESCRIPTION OF THE DRAWINGS

The Detailed Description is set forth and the teachings are described with reference to the accompanying figures.

FIG. 1 is a table showing the result of compiling the body of an exemplary formula.

FIG. 2 is a diagram showing the main loop of one embodiment of a matching interpreter.

FIG. 3 is a diagram showing an exemplary environment in which to operate embodiments of the matching interpreter and method as described herein.

DETAILED DESCRIPTION

Described herein are methods for automatically analyzing formulas and adding pattern annotations to quantifiers based on a database of common pattern idioms using a satisfiability modulo theory (SMT) solver. An SMT solver decides the satisfiability of prepositionally complex formulas in theories such as arithmetic and uninterpreted functions with equality. An SMT solver is a tool for deciding the satisfiability or the validity of formulas in theories. SMT solvers enable application of bounded model checking to infinite systems.

In computability theory and computational complexity theory, a decision problem is a question in some formal system with a yes or no answer, depending on the values of some input parameters. For example, a decision problem is the this: "given two numbers x and y, does x evenly divide y?" The answer can be either "yes" or "no," and depends upon the values of x and y. Decision problems are closely related to function problems. Function problems can have answers that are more complex than a binary result such as yes or no, or true or false. A corresponding function problem is "given two numbers x and y, what values, if any, lie between x and y?"

In terms of the theory behind theorem provers, a user may choose to axiomatize a function f as injective by using the axiom:

$$\forall x,y \cdot \{f(x),f(y)\} \cdot f(x)=f(y) \rightarrow x=y \qquad (1)$$

The axiom states that for every x and for every y, if function f produces the same value on x and y, then x equals y. Or stated in a contra-positive way, if x and y are different, then the values of function f on x and y are also different.

In Equation 1, the axiom is annotated by patterns f(x) and f(y) within the curly braces. This annotation is a hint to a quantifier instantiation module to search for all terms in the current context that match f(x) and f(y) where the variables x and y may be instantiated by any term. The effect of such a pattern is that every term that is built from an application of f will be a valid candidate for the pattern. If there are n such terms, then there are $n^2$ combinations matching $\{f(x), f(y)\}$.

A much better axiom and pattern set is the following:

$$\forall x \cdot \{f(x)\} \cdot g(f(x))=x \qquad (2)$$

In Equation 2, the function g can be an arbitrary function not appearing anywhere in the constraints. The pattern only has n instances, which is much smaller than $n^2$. However, the untrained specifier is much more likely to specify the first axiom as found in Equation 1, and not the equivalent axiom as found in Equation 2. Thus a challenge remains how to efficiently detect miss-conceived formulas and pattern annotations.

To detect ill-conceived patterns of the form illustrated in Equation 1, a simple syntactic match on the abstract syntax tree of formulas is insufficient. For example, both the arithmetical successor function and predecessor function are injective, but they have different names and it is not realistic to populate a database with an unbounded set of names.

A good detection mechanism must at least be able to handle syntactic permutations, but there is a limit to how far one should take the general problem of checking equivalence because such detection may be highly infeasible.

More refined matching on abstract syntax trees is possible by using first-order matching. First-order matching allows using variables instead of any sub-term. The variables act as place holders for entire sub-trees. A variable can be repeated in a pattern, in which case the formula that is being matched against must have precisely the same sub-tree in all the positions corresponding to the variable. First-order matching is limited in that it does not allow matching functions separately from the arguments the functions are applied to. Thus, for example, for a term max(a,b), first-order matching can only match all of max(a,b), or possibly sub-terms a, or b. First-order matching cannot separate the function symbol "max" from its arguments. Second-order matching allows matching separately function symbols and arguments.

In the context of first-order matching, terms and formulas are matched by their syntactic appearance. Variants of first-order matching exist, where terms and formulas are matched relative to a set of equality constraints. This variant is known as E-matching. Equality constraints impose equivalence classes of terms and sub-terms. Matching a term then becomes a matter of matching some term in the equivalence class. Contrary to standard first-order matching, the E-matching problem is not unitary. That is, there may be more than one substitution, each incompatible with each other, matching a term.

Second-order matching allows for also matching on function symbols without matching on the bodies. For example, the pattern ?MIN(?MAX(a,b), ?MAX(c,d)), uses the second-order variables ?MIN, ?MAX and constants a, b, c, d. It matches terms, such as max(min(a,b),min(c,d)) with the substitution ?MIN←max, ?MAX←min. It also matches the term max(min(c,d),min(a,b)) when using the substitution ?MIN←λ(x,y)·max(y,x), ?MAX←min. Thus, in second-order matching, the names of function symbols can be bound at the time of matching.

In contrast, in first-order matching, only constants or compound terms can be used to bind variables. The example instantiation ?MIN←λ(x,y)·max(y,x) illustrates that second-order matching is in general allowed to instantiate function symbols using compound functions. Later, as described herein, a notion of weak second-order matching is introduced to enable restricting the admissible matches to only function symbols. In return, the result is an algorithm for dealing with permutations of bound identifiers.

Other common idioms are axioms that are used for function definitions. For example, for the axiom "for all x and y for the function max(x,y)" is equivalent to "if x>y then x else y." It is advantageous to pattern match on "max(x,y)" and not "x>y", or "if x>y then x else y" to handle an implementation that defines a maximum using more basic operations.

In one embodiment, in order to handle such patterns, weak and strong second-order pattern variables are used. A template of the form $$\forall x,y \{?f(x,y)\} \cdot ?f(x,y)=?G(x,y) \qquad (3)$$

introduces a weak second-order pattern variable ?f and a standard pattern variable ?G to distinguish the matching problem on function symbols or general terms. The meaning is that the variable ?f can only be instantiated with function symbols, such as max, whereas ?G may be instantiated by compound terms, such as ?G=λ(x,y). if x>y then x else y.

Turning to an embodiment of matching, in order to detect specified formulas, a database of formulas is maintained. The database may contain formulas with first-order and second-order place-holders and first-order patterns. The database is searched for matches when processing externally supplied formulas. An externally supplied formula may alternatively be referred to as an arbitrary formula or testable formula to distinguish it from a known formula such as the formulas stored in the formula database.

Upon matching a formula from the database, several actions can be taken. For example, one action is performing an in-place modification of the input formula. Another action is to use patterns supplied in the formula from the database as guidance for adding patterns to the external formula.

In one embodiment, formulas in a database contain placeholders that are used to allow formulas with different names to match a given pattern formula. The placeholders can be first-order or second-order. The second-order placeholders can be either strong or weak. There is not any minimum make-up of these pattern formulas. They may contain no placeholders at all such that there are no variables for matching. These formulas may also have associated a set of first-order patterns, which are used when the theorem prover uses the formula. The formulas of the database may be compiled into code sequences and then the code sequences are merged into code trees. Code trees serve as a representation of a formula from the database and is used for making lookups more efficient.

As an example, a database DB may be created and populated with entries of the form <formula with first-order, second-order place-holders and/or first-order patterns>. The i-th entry may be referred to as <placeholder_fml_i, patterns_i>. It is possible to lookup a formula fml in the database DB by matching each placeholder_fml_i with fml. If there is a substitution subst, such that subst(pattern fml_i) is equal to fml, then the output is subst(patterns_i).

Also, as an example, fml would be replaced where fml is of the form forall x,y,z·old-patterns·body by forall x,y·new-patterns·body. Where new-patterns is subst(patterns_i).

A tailored version of second-order matching (mixed second order-order matching) is used in order to match formulas within the database taking into account renaming of functions, relations, constants, and bound variables. Term matching allows fitting terms with a pattern, where a pattern is a term with place-holders called pattern variables. A term matches a first-order pattern when it has the same structure as the pattern, except for possibly the locations of the place-holders. A place-holder (pattern variable) may be repeated in a pattern, in which case a term must contain the same sub-terms at the two positions in order to match the pattern.

Second-order patterns contain place-holders for function applications, and second-order matching performs matching of terms with second-order patterns by instantiating functions in place-holder positions. In general, second-order matching will match function place-holders by any closure containing place holders for the number of arguments to the function. However, such matching prevents the pattern matcher from distinguishing whether it is matching a function application directly or a compound closure. Therefore, in a preferred embodiment, mixed second-order pattern matching is introduced for instantiating second-order place-holders by functions (and not closures).

In one embodiment, weak second-order pattern variables are used to match against function applications. In general, it is possible to use strong second order pattern variables with any combination of arguments, but a known restriction that allows for a unitary matching problem requires the arguments to pattern variables to be a list of indices for different bound variables. In a preferred embodiment, this restriction is used in the manner described herein as it simplifies the summary of the matching abstract state machine. However, nothing herein requires this restriction to be used.

When a formula binds variables, the order of the bound variables is essentially irrelevant. Bound variable permutations are equivalent. For example, if there are n bound variables, bound variables with indices $0, \ldots, n-1$ are identified. A match between the bound variables in a pattern and a term can therefore be regarded as a permutation of the numbers $0, \ldots, n-1$. In an embodiment, arrays (e.g. arrays named "bound" and "boundPattern") are used to keep track of any permutations. Permutations of bound indentifiers are in the scope of weak second-order variables or function symbols.

State is maintained by a matching algorithm. In automated deduction, it is common to compile terms into code that can be efficiently executed at retrieval time. A compiler produces code for a real machine, or for a virtual machine. In this description, the mixed pattern-matching procedure is used with an abstract machine for matching modulo equalities or E-matching.

Exemplary Implementation

In one exemplary implementation of the method described herein, the memory of an abstract machine may be divided in the following way. A register (e.g. "pc") is registered for storing the current instruction. An array of registers (e.g. "reg[ ]") is registered for storing ground terms. A stack (e.g. "bstack") is registered for backtracking. An array (e.g, "bound") is registered to map indices of bound variables in the pattern with bound variables in the matched term. An array (e.g. "boundPattern") is registered to map indices of bound variables in the pattern to a number.

The basic instruction set of an abstract machine comprises the following pseudo-functions or sets of instructions: init, bind, check, compare, choose, yield, and backtrack. These pseudo-functions handle standard first-order matching.

The basic instruction set is augmented by the following pseudo-functions or sets of instructions: setvar, checkvar, setbound, and checkbound. These pseudo-functions handle weak-second-order pattern matching. The sets of instructions setvar2 and checkvar2 handle standard second-order pattern variables. Finally, pseudo-functions or sets of instructions bind-ac and choose-ac handle associative or commutative matching.

Table 1 shows a summary of pseudo-functions used by one embodiment of an abstract machine for mixed second-order matching.

TABLE 1

| Instruction op-code | Side-effect |
|---|---|
| init(f, next) | assuming reg[0] = $f(t_1, \ldots t_n)$<br>reg[1] := $t_1$; . . . ; reg[n] := $t_n$<br>pc := next |
| bind(i, f, o, next) | if $f(t_1, \ldots t_n)$ = reg[i] then<br>reg[o] := $t_1$; . . . ; reg[o+n−1] := $t_n$<br>pc := next<br>else pc := backtrack |
| bind-ac(i, f, n, o, next) | if $f(t_1, \ldots t_n)$ = reg[i] then<br>push(bstack, choose-ac(i, f, o, n!, 1, next))<br>pc := backtrack |
| setvar(?f, i, n, o, next) | let $f(t_1, \ldots t_m)$ = reg[i]<br>if n = m then<br>reg[o] := $t_1$; . . . ; reg[o+n−1] := $t_n$<br>pc := next<br>else pc := backtrack |
| checkvar(i, j, o, next) | let $f(s_1, \ldots, s_n)$ = reg[i]<br>let $g(t_1, \ldots, t_m)$ = reg[j]<br>if f = g ∧ n = m then<br>reg[o] := $t_1$; . . . ; reg[o+n−1] := $t_n$<br>pc := next<br>else pc := backtrack |
| setbound(i, b, n, next) | if reg[i] is a bound variable and for all<br>j < n . bound[j]<br>≠ reg[i] then<br>bound[n] := reg[i]<br>boundpattern[n] := b<br>pc := next<br>else pc := backtrack |
| checkbound(i, n, next) | if bound[n] = reg[i] then<br>pc := next<br>else pc := backtrack |
| setvar2(?G, i, ps, next) | let $t(b_1, \ldots, b_n)$ = reg[i]<br>where $b_1$ = bound[$p_1$], . . . , $b_n$ = bound[$p_n$]<br>S[?G] := $\lambda x_1, \ldots, x_n . t[x_1, \ldots, x_n]$<br>pc := next |
| checkvar2(?G, i, ps, next) | let $t(b_1, \ldots, b_n)$ = reg[i]<br>where $b_1$ = bound[$p_1$], . . . , $b_n$ = bound[$p_n$]<br>if S[?G](ps) = $t[p_1, \ldots, p_n]$ then<br>pc := next<br>else pc := backtrack |
| check(i, t, next) | If reg[i] = t then<br>pc := next<br>else pc := backtrack |
| compare(i, j, next) | if reg[i] = reg[j] then<br>pc := next<br>else pc := backtrack |
| choose(alt, next) | if alt ≠ nil then push(bstack, choose(alt))<br>pc := next |

TABLE 1-continued

| Instruction op-code | Side-effect |
| --- | --- |
| yield($i_1, \ldots, i_k$) | yield substitution $\{x_1$ a reg$[i_1], \ldots, x_k$ a reg$[i_k]\}$ |
| backtrack | if bstack is not empty then pc := pop(bstack) else pc := stop |
| choose-ac(i, f, o, n!, j, next) | if n! > j then let $f(t_1, \ldots, t_n)$ = reg[i] let $t_{i1}, \ldots, t_{in}$ be the jth permutations of $t_1, \ldots, t_n$ reg[o] := $t_1$; ... ; reg[o+n−1] := $t_n$ push(bstack, choose-ac(i, f, o, n!, j+1, next)) pc := next else pc := backtrack |

Setvar compiles the first processed occurrence of ?f in a second-order pattern ?f($p_1, \ldots, p_n$) into an instruction of the form setvar(?f, I, n, o, next) where ?f is a function placeholder, i is the index of a register, n is the arity of ?f, and o is the offset of the next available register. During pattern matching, when encountering a setvar instruction, the machine stores the top-most function symbol for the term stored in register i and checks that it has n arguments. If it has, then the machine stores the arguments to the term in registers of an array of registers (e.g. reg[i]) starting with offset o.

Checkvar compiles subsequent occurrences of ?f in a pattern into instructions of the form checkvar(i, j, o, next). During pattern matching, when encountering a checkvar instruction, the machine checks that the functions labeling the contents of registers reg[i] and reg[j] are the same, and then the machine stores the arguments to the terms in register j in the registers starting with offset o.

Setbound and checkbound are specific pseudo-functions or sets of instructions to match bound variables. Setbound and checkbound, allow the machine to pattern match permutations of bound variables.

Setbound is used for matching the first occurrence of a given bound variable in a pattern. Setbound takes the following parameters: i (the index of the register where the current matched subterm resides), n (indicates matching on the nth bound variable), and next (pointer to the next instruction).

Checkbound matches subsequent occurrences of a bound variable in a pattern. Checkbound also checks that the bound variable in the pattern gets associated with the same bound variable in the matched term. Checkbound takes the following parameters: i (the index of the register where the current matched subterm resides), n (indicates matching on the nth bound variable), and next (pointer to the next instruction).

Setvar2 translates the first occurrence of ?G(ps) of a strong second-order pattern variable ?G with parameters ps into an instruction of the form setvar2(?G, i, ps, next). The setvar2 parameters are: ?G (the name of the strong second-order pattern variable), i (the index of the register where the current matched sub-term resides), ps (the list of bound variables that ?G is applied to), and next (a pointer to the next instruction).

Checkvar2 checks that subsequent occurrences of a pattern variable ?G(ps) match the term previously matched with ?G, except for occurrences of bound variables.

Bind-ac is a modified version of the pseudo-function bind that extends in a direct way to associative-commutative functions. Bind-ac creates a restore point which allows backtracking over all relevant permutations.

The choose-ac instruction backtracks over restore points. This instruction retrieves the j-th permutation of given pattern arguments and tries matching the current term (e.g. in register i) and moves to the instruction next.

As an example of the described pseudo-functions, FIG. 1 illustrates the result of compiling the body of the following formula:

$$\forall x, y \cdot \neg (f(x) = f(y)) \lor x = y \quad (4)$$

FIG. 2 shows the main loop of one embodiment of a matching interpreter. With reference to FIG. 2, the matching interpreter is executed 202 and examines the instruction op-code shown in Table 1 and performs each of the corresponding side-effects. Matching terminates and the results are outputted 206 when the current instruction is stop 204. Otherwise, the matching interpreter continues operating.

FIG. 3 is a diagram of a representative computing environment in which the method described herein may be used. With reference to FIG. 3, such computing environment 300 comprises a general-purpose computing device in the form of a computer 302. One or more media player applications can be executed by the computer 302. The components of the computer 302 may comprise one or more processors or processing units 304 (optionally including a cryptographic processor or co-processor), a system memory 306, and a system bus 308 that couples various system components including the processor 304 to the system memory 306.

The system bus 308 represents one or more of any of several types of bus structures, including a memory bus or memory controller, a point-to-point connection, a switching fabric, a peripheral bus, an accelerated graphics port, and a processor or local bus using any of a variety of bus architectures. By way of example, such architectures comprise an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

An exemplary computer 302 typically comprises a variety of computer readable media. Such media can be any available media that is accessible by computer 302 and comprises both volatile and non-volatile media, removable and non-removable media.

The system memory 306 comprises computer readable media in the form of volatile memory, such as random access memory (RAM) 310, non-volatile memory, such as read only memory (ROM) 312, or both. A basic input/output system (BIOS) 314, containing the basic routines that help to transfer information between elements within a computer 302, such as during start-up, is stored in ROM 312. RAM 310 typically contains data, program modules, or both, that are immediately accessible to or processed by the processing unit 304.

Computer 302 may also comprise other removable/non-removable, volatile/non-volatile computer storage media. By way of example, FIG. 3 illustrates a hard disk drive 316 for reading from and writing to a non-removable, non-volatile magnetic media (not shown), a magnetic disk drive 318 for reading from and writing to a removable, non-volatile magnetic disk 320 (e.g., a "floppy disk"), and an optical disk drive 322 for reading from and/or writing to a removable, non-volatile optical disk 324 such as a CD-ROM, DVD-ROM, or other optical media. The hard disk drive 316, magnetic disk drive 318, and optical disk drive 322 are each connected to the system bus 308 by one or more data media interfaces 325. Alternatively, the hard disk drive 316, magnetic disk drive 318, and optical disk drive 322 can be connected to the system bus 308 by one or more interfaces (not shown).

The disk drives and their associated computer-readable media, or processor-readable media, provide non-volatile storage of computer readable instructions, data structures, program modules, and other data for computer 302. Although the example illustrates a hard disk 316, a removable magnetic disk 320, and a removable optical disk 324, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be used to implement the example computing system and environment.

Any number of program modules can be stored on the hard disk 316, magnetic disk 320, optical disk 324, ROM 312, RAM 310, or combination thereof, including by way of example, an operating system 326, one or more application programs 328, program modules 330, and program data 332. Each of such operating system 326, one or more application programs 328, other program modules 330, and program data 332 (or some combination thereof) may implement all or part of the resident components that support the distributed file system.

A user can enter commands and information into computer 302 via input devices such as a keyboard 334 and a pointing device 336 (e.g., a "mouse"). Other input devices 338 (not shown specifically) may comprise a microphone, joystick, game pad, satellite dish, serial port, scanner, and the like. These and other input devices are connected to the processing unit 304 via input/output interfaces 340 that are coupled to the system bus 308, but may be connected by other interface and bus structures, such as a parallel port, game port, or a universal serial bus (USB).

A monitor 342 or other type of display device can also be connected to the system bus 308 via an interface, such as a video adapter 344. In addition to the monitor 342, other output peripheral devices may comprise components such as speakers (not shown) and a printer 346 which can be connected to the computer 302 via input/output interfaces 340.

A computer 302 on which to practice the protocol described herein operates in a networked environment using logical connections to one or more remote computers, such as a remote computing device 348. By way of example, the remote computing device 348 can be a personal computer, portable computer, a server, a router, a network computer, a peer device or other common network node, game console, and the like. The remote computing device 348 is illustrated as a portable computer that can include many or all of the elements and features described herein relative to computer 302.

Logical connections between a computer 302 and a remote computer 348 are depicted as a local area network (LAN) 350 and a general wide area network (WAN) 352 or Internet. It is to be understood that a computer 302 and remote computer 348 are connected such that the protocol described herein is enabled. In one embodiment, such connection is a switched fabric communications link used in high-performance computing. Such connection is preferably a point-to-point bidirectional serial link.

When implemented in a SAN networking environment, the computer 302 is connected to a local network 350 via a network interface or system area network (SAN) adapter 354 or SAN-enabled NIC. It is to be appreciated that the illustrated network connections are exemplary and that other means of establishing communication link(s) between the computers 302 and 348 can be employed.

In a networked environment, such as that illustrated with computing environment 300, program modules depicted relative to the computer 302, or portions thereof, may be stored in a remote memory storage device. By way of example, remote application programs 358 reside on a memory device of remote computer 348. For purposes of illustration, application programs and other executable program components such as the operating system are illustrated herein as discrete blocks, although it is recognized that such programs and components reside at various times in different storage components of the computing device 302, and are executed by the data processor(s) of the computer.

In the previous description, the embodiments were described with reference to acts and symbolic representations of operations that are performed by one or more computers, unless indicated otherwise. As such, it is understood that such acts and operations, which are at times referred to as being computer-executed, comprise the manipulation by the processing unit of the computer of data in a structured form. This manipulation transforms the data or maintains it at locations in the memory system of the computer, which reconfigures or otherwise alters the operation of the computer in a manner well understood by those skilled in the art. The data structures, where data is maintained, are physical locations of the memory that have particular properties defined by the format of the data. However, the embodiments are not meant to be limiting as those of skill in the art appreciate that various acts and operation described hereinafter may also be implemented in hardware.

Turning to the drawings, wherein like reference numerals refer to like elements, the embodiments are illustrated as being implemented in a suitable computing environment. Although not required, the embodiments will be described in the general context of computer-executable instructions, such as program modules, being executed by a computer. Generally, program modules comprise routines, programs, objects, components, data structures, etc., that perform particular tasks or implement particular abstract data types. Moreover, those skilled in the art appreciate that the embodiments may be practiced with other computer system configurations, including, for example, hand-held devices, multi-processor systems, microprocessor based or programmable consumer electronics, network PCs, minicomputers, mainframe computers, and the like.

Although the description above uses language that is specific to structural features and methodological acts, it is to be understood that the embodiments defined in the appended claims is not limited to the specific elements, features, modes, or acts described. Rather, the specifics are disclosed as exemplary forms.

In view of the many possible embodiments to which the principles described herein may be applied, it should be recognized that the embodiment described herein with respect to the drawing figures is meant to be illustrative only and should not be taken as limiting. For example, the illustrated embodiment can be modified in arrangement and detail without departing from the spirit of that described herein. Therefore, the description herein contemplates all such embodiments as may come within the scope of the following claims and equivalents thereof.

We claim:

1. In a computing environment comprising at least one processor and one computer-readable storage media, a method for inferring formula patterns in an arbitrary formula using mixed second-order pattern matching, the method comprising:
- accessing the arbitrary formula;
- instantiating each first-order place-holder in the arbitrary formula by one or more sub-formulas or one or more sub-terms;
- checking that multiple instantiations of each sub-term or each sub-formula coincide when instantiating a same pattern variable;
- instantiating each second-order place-holder in the arbitrary formula by making one or more substitutions for one or more functions and for one or more relation symbols in the arbitrary formula, wherein:
  - the instantiation of each second-order place-holder in the arbitrary formula is performed by (i) compiling the arbitrary formula into an arbitrary code sequence and (ii) matching the arbitrary code sequence against matching formulas and matching relation symbols, wherein the matching formulas and the matching relation symbols are compiled into matching code sequences, and wherein the matching code sequences are maintained as entries in a matching database as first formulas with first-order place-holders, second formulas with second-order place holders, and first-order patterns; and
  - one of the one or more substitutions for at least one function of the one or more functions in the arbitrary formula includes a pseudo-function comprising:
    - an associated second-order place-holder representing a function symbol of the at least one function;
    - a first variable of the pseudo-function that is equal to an arity of the at least one function; and
    - a second variable of the pseudo-function that is equal to an offset of a next available register, wherein the next available register is a first register of an array of registers that is reserved for storing a plurality of arguments associated with the at least one function;
- identifying a bound identifier in the arbitrary formula; and
- associating a first occurrence of the bound identifier in the arbitrary formula with a permutation, the permutation comprising a sub-term that resides on an index of the first register, the sub-term being in a scope of weak second-order variables or function symbols.

2. The method of claim 1 wherein arguments to the same pattern variable include a list of indices for different bound identifiers.

3. The method of claim 1 wherein the compiling the arbitrary formula into the arbitrary code sequence comprises compiling instructions for weak second-order pattern matching.

4. The method of claim 3 wherein the compiling the arbitrary code sequence further comprises executing by the at least one processor, a check-bound instruction.

5. The method of claim 4 wherein the compiling the arbitrary code sequence further comprises compiling a first instruction that translates an occurrence of a pattern variable and a second instruction that checks that occurrences of the pattern variable match a term.

6. The method of claim 5 wherein the compiling the arbitrary code sequence further comprises creating a restore point for backtracking over relevant permutations associated with bound identifiers.

7. One or more computer memory having computer-executable instructions stored thereon that, when executed, direct a computer to perform operations comprising:
- accessing an arbitrary formula pattern;
- compiling the arbitrary formula pattern into a testable code sequence, the testable code sequence comprising one or more instructions received from a remote computing device;
- comparing the testable code sequence, term by term, to known code sequences, the known code sequences being stored in a code sequence database, wherein the code sequence database comprises a combination of formulas with first-order place-holders, formulas with second-order place holders, and first-order patterns;
- merging known code sequences associated with the testable code sequence to form a code tree;
- instantiating second-order place-holders by known formulas in the testable code sequence, the known formulas being stored in a functions database, at least one of the known formulas including a pseudo-function that comprises:
  - at least one of the second-order place-holders representing a function symbol of a function in the arbitrary formula pattern;
  - a first variable of the pseudo-function that represents an arity of the function in the arbitrary formula pattern; and
  - a second variable of the pseudo-function that is equal to an offset of a next available register, wherein the next available register is a first register of a plurality of registers that are reserved for storing arguments associated with the function in the arbitrary formula pattern;
- matching a term of the testable code sequence with a permutation of the term, the permutation comprising a sub-term in a weak second-order pattern stored in a database of patterns; and
- associating a first occurrence of a matching term in the testable code sequence with the permutation of the matching term.

8. The one or more computer memory of claim 7 wherein the permutation of the term is stored in the database of patterns.

9. The one or more computer memory of claim 7 wherein arguments associated with the terms in the weak second-order patterns come from a list of indices for different bound identifiers.

10. The one or more computer memory of claim 7 wherein comparing the testable code sequence comprises executing instructions for weak second-order pattern matching.

11. The one or more computer memory of claim 10 wherein comparing the testable code sequence further comprises executing a set-bound instruction.

12. The one or more computer memory of claim 11 wherein comparing the testable code sequence further comprises executing a first instruction that translates an occurrence of a pattern variable and a second instruction that checks that occurrences of a pattern variable match a term.

13. The one or more computer memory of claim 12 wherein comparing the testable code sequence further comprises executing instructions for associative matching.

14. A system for inferring formula patterns in an arbitrary formula pattern using mixed second-order pattern matching, the system comprising:
- at least one processor;
- modules executed by the processor that perform operations comprising:

accessing an arbitrary formula pattern;

compiling the arbitrary formula pattern into a testable code sequence, the testable code sequence comprising one or more instructions received from a remote computing device;

comparing the testable code sequence, term by term, to known code sequences, the known code sequences being stored in a code sequence database, wherein the code sequence database comprises a combination of formulas with first-order place-holders, formulas with second-order place holders, and first-order patterns;

merging known code sequences associated with the testable code sequence to form a code tree;

instantiating second-order place-holders by known formulas in the testable code sequence, the known formulas being stored in a functions database, at least one of the known formulas including a pseudo-function that comprises:

at least one of the second-order place-holders representing a function symbol of a function in the arbitrary formula pattern;

a first variable of the pseudo-function that represents an arity of the function in the arbitrary formula pattern; and a second variable of the pseudo-function that is equal to an offset of a next available register, wherein the next available register is a first register of a plurality of registers that are reserved for storing arguments associated with the function in the arbitrary formula pattern;

matching a term of the testable code sequence with a permutation of the term, the permutation comprising a sub-term in a weak second-order pattern stored in a database of patterns; and associating a first occurrence of a matching term in the testable code sequence with the permutation of the matching term.

15. The system of claim 14 wherein the permutation of the term is stored in the database of patterns.

16. The system of claim 14 wherein arguments associated with the terms in the weak second-order patterns come from a list of indices for different bound identifiers.

17. The system of claim 14 wherein comparing the testable code sequence comprises executing weak second-order pattern matching.

18. The system of claim 17 wherein comparing the testable code sequence further comprises executing a set-bound instruction.

19. The system of claim 18 wherein comparing the testable code sequence further comprises executing a first instruction that translates an occurrence of a pattern variable and a second instruction that checks that occurrences of a pattern variable match a term.

20. The system of claim 19 wherein comparing the testable code sequence further comprises executing instructions for associative matching.

* * * * *